United States Patent [19]

Panton

[11] Patent Number: 5,260,910

[45] Date of Patent: Nov. 9, 1993

[54] HIGH RESOLUTION ACOUSTIC PULSE-ECHO RANGING SYSTEM

[75] Inventor: Stanley Panton, Peterborough, Canada

[73] Assignee: Milltronics Ltd., Peterborough, Canada

[21] Appl. No.: 961,532

[22] Filed: Oct. 15, 1992

[51] Int. Cl.$^5$ .............................................. G01S 15/00
[52] U.S. Cl. ........................................ 367/99; 367/98; 367/100; 367/900
[58] Field of Search ..................... 367/99, 98, 100, 900

[56] References Cited

U.S. PATENT DOCUMENTS

| | | | |
|---|---|---|---|
| 3,562,703 | 2/1971 | Grada | 367/901 |
| 4,000,650 | 1/1977 | Snyder | 367/900 |
| 4,596,144 | 6/1986 | Panton et al. | 73/290 X |
| 4,850,226 | 7/1989 | Allen et al. | 367/903 |
| 5,131,271 | 7/1992 | Haynes et al. | 367/99 |

FOREIGN PATENT DOCUMENTS 156636 10/1985 European Pat. Off. .

OTHER PUBLICATIONS

"Donar: a computer processing system to extend ultrasonic pulse-echo testing", Lees et al, Ultrasonics, Jul. 1973.

Primary Examiner—Daniel T. Pihulic
Attorney, Agent, or Firm—Ridout & Maybee

[57] ABSTRACT

The uncertainty inherent in high-resolution acoustic pulse-echo distance measuring systems which depend on threshold detection is overcome by transmitting a multi-cycle shot of acoustic energy having a sharply peaked amplitude profile, and locating the peak amplitude of a received echo. The peaked amplitude is achieved by timing the duration of energization of a transducer producing the shot so that energization is terminated before the amplitude of oscillation of the transducer has reached a maximum. This produces a shot which has a definite largest cycle, which should in turn produce an echo having a definite largest cycle.

5 Claims, 6 Drawing Sheets

HIGH RESOLUTION ACOUSTIC PULSE-ECHO RANGING SYSTEM

BACKGROUND OF THE INVENTION

1. Field of the Invention

This invention relates to acoustic pulse-echo distance measuring apparatus, of the type in which a pulse of acoustic energy is transmitted towards a reflective surface whose distance is to be measured, and a reflected return echo of the pulse is received and detected, the elapsed time between the transmission of the pulse or shot and the reception of the echo being a measure of the distance of the reflective surface.

2. Review of the Art

In practice, the transmitted shot, which consists of a number of cycles of sound at a specific frequency, has a finite rise time since the transducer used to generate the acoustic energy may typically require several cycles to reach its full amplitude. This in turn means that the echo also must have a finite rise time. The transmitted shot will also have a finite fall or "ring-down" time as the transducer radiates stored energy following the end of the energization pulse used to generate the shot.

Traditional echo detection systems depend upon the magnitude of the echo exceeding some pre-determined "detection threshold", because the rising edge of the echo has each succeeding cycle slightly greater than the one which preceded it. It is difficult if not impossible to arrange that the echo will always exceed the threshold on the same cycle for every echo received. This is especially true at close target range where it is necessary that the sensitivity of the receiver be reduced in order that the transducer ring-down will not be detected.

The receiver sensitivity must change very rapidly to match the transducer ring-down characteristic, while any automatic gain control which might attempt to regulate the echo size must necessarily be of much slower response. This causes the echo as seen at the receiver's output to be reduced in size as the target moves into the range where the receiver's sensitivity is reduced to ignore the transducer ring-down.

If the echo size is reduced by even a small amount the detection threshold may not be reached on, for example, the fourth cycle of the echo rise but may instead occur during the fifth cycle thereby introducing a range detection error equivalent to the wavelength of the transmitted signal. In an ultrasonic distance measuring systems operating in air at 50 khz the error amounts to nearly a quarter of an inch.

In practice that echo size and shape in ultrasonic distance measuring systems is also somewhat variable because of such factors as air turbulence, sloshing liquid surfaces, the nature of the surface itself, dusty atmospheres, and so on.

In an article "DONAR: a computer processing system to extend ultrasonic pulse-echo testing" by Lees et al, Ultrasonics, July 1973, a system is described in which single cycle pulses are transmitted at a rapid repetition rate towards a target, and the peaks of the return echoes are detected by a digital sampling system. Such a system avoids any ambiguity as to the echo position, but is only suitable when a single cycle pulse is transmitted which is not usually practicable in industrial process control applications in which such a pulse would have insufficient energy, and the received signal would be too difficult to detect against a noisy background. A somewhat similar technique, in which the transmitted pulse is limited to a single half cycle, is disclosed as applied to a level measuring system in U.S. Pat. No. 4,850,226, issued to Allen et al. This approach severely limits the energy that the pulse can contain, as well as transducer efficiency, which restricts the range and noise immunity of the system.

Published European Patent Application No. 156636 (Salubre Investments Limited) discloses the extraction of a leading edge portion of a return echo and its analysis to provide data as to the nature of the reflecting surface.

U.S. Pat. No. 4,000,650 (Snyder) discloses the sampling of and digitising of return signals, the largest digital value received being utilized to determine the position of the return echo. The echo signals are however detected and isolated prior to digitisation, and the sampling rate is low compared to the frequency utilised. The system is therefore only useful for selecting between alternative echoes since its resolution is not high enough to be useful in determining with precision the position of an echo.

In U.S. Pat. No. 4,596,144, of which I am co-inventor, I employed threshold detection techniques for determining echo position, and similar techniques are utilized in the system described in the later U.S. patents of the co-inventor of U.S. Pat. No. 4,596,144, Steven Woodward.

SUMMARY OF THE INVENTION

I have now found that the uncertainty inherent in existing high-resolution acoustic pulse-echo distance measuring systems which depend on threshold detection can be overcome by transmitting a multi-cycle shot of acoustic energy having a sharply peaked amplitude profile, and locating the peak amplitude of a received echo. By "sharply peaked" is meant that there should be no ambiguity as to which cycle of the transmitted shot has the highest amplitude. I have found that this requirement can be fulfilled by timing the duration of energization of a transducer producing the shot so that energization is terminated before the amplitude of oscillation of the transducer has reached a maximum. This produces a shot which has a definite largest cycle, which should in turn produce an echo having a definite largest cycle. An automatic gain control which holds the echo amplitude to some convenient level will not affect this characteristic, since its response time must necessarily be slow enough to avoid suppressing wanted echo data. Similarly, time varying gain may be used to compensate for ring-down without affecting operation. The receiver should of course have a bandwidth sufficient to reproduce the response of the transducer without substantially affecting the rise time of received echoes. The transducer should have a sufficiently high Q or quality factor that it requires plural cycles for its amplitude of oscillation to reach a maximum after application of an alternating potential.

SHORT DESCRIPTION OF THE DRAWINGS

DESCRIPTION OF THE PREFERRED EMBODIMENT

Figure 1:
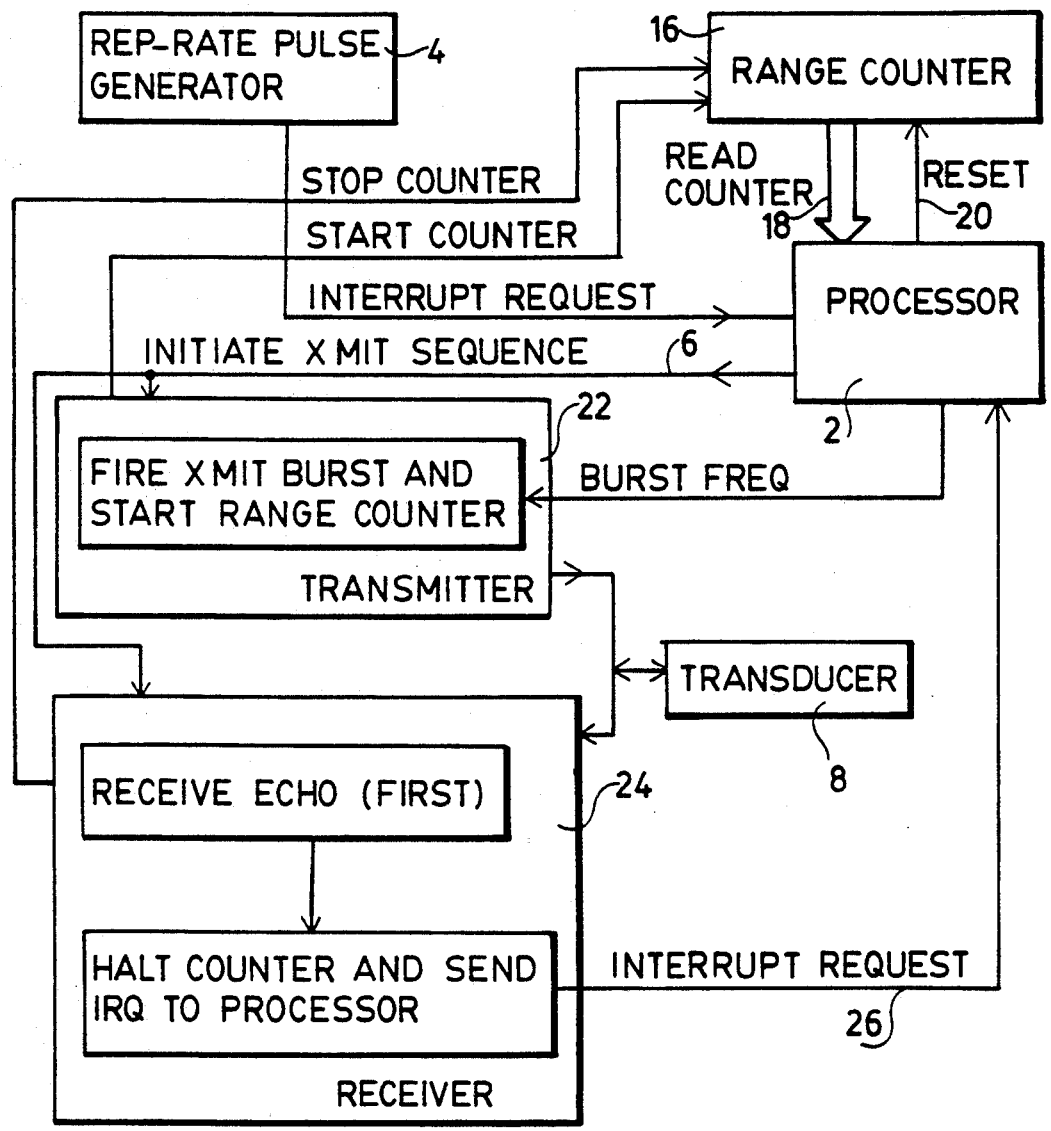
FIG. 1 is a functional block diagram of a level measuring instrument.

The invention will be described in the context of a microprocessor controlled level measuring instrument, in which the microprocessor 2 is programmed to process data it receives as to the time taken for an echo to travel between an acoustic transducer and the surface of a liquid; for example it may calculate in turn the depth of liquid in a channel being monitored, there and in accordance with known characteristics of the channel, the flow rate through the channel. These functions form no part of the present invention and will not be described further. The functioning of the processor will only be described to the extent that it is involved in the capture of raw data for processing. The processor 2 should be understood to include peripheral devices and memory as well as a microprocessor.

A repetition rate pulse generator 4, which may itself be programmable as to its repetition rate by the processor 2, generates pulses of regular intervals corresponding to the intervals at which the level of the liquid surface is to be measured. The selection of these intervals again forms no part of the present invention, except that the intervals must be sufficient to permit completion of the routines to be described below. The pulses generated by generator 4 are applied to the processor 2 as interrupt requests, and engender a very simple interrupt service routine which consists merely of instructing an output port 6 to output a blanking signal for a predetermined length of time sufficient to extend for the duration of a transmit pulse (discussed further below) and such further time as is required for high amplitude ringing of a transducer 8 (see FIG. 3) to die down following the transmit pulse. The duration of this blanking signal may be programmable but this again forms no part of the present invention. The blanking signal initiates an operation of the transmitter and receiver of FIGS. 3 and 4 independently of further intervention by the processor, although as mentioned below, a divider 10 (see FIG. 3) which generates the transmission frequency of the transmitter shares the processor clock 12, and has a division ratio which may be programmed by another output port 14 of the processor. Additionally, a range counter 16 is also connected to input ports 18 of the processor (typically a 16 bit counter will be desirable to provide adequate resolution) so that a count may be read from the counter, and an output port 20 is provided by means of which the counter may be reset.

Referring to FIG. 1, generation of the blanking signal on port 6 initiates a transmit sequence of a transmitter 22 which results in generation of a burst of high frequency electrical energy which is applied to the transducer 8. Simultaneously with the commencement of this burst, a "start counter" signal is applied to the range counter 16, which counts at a rate sufficient to provide a desired resolution of the instrument. Typically the count rate may be about 1 mHz, obtained by division of the processor clock. The blanking signal from port 6 is also provided to the receiver so as to prevent it from responding to the burst from the transmitter, or high amplitude ringing of the transducer following the burst.

Figure 2:
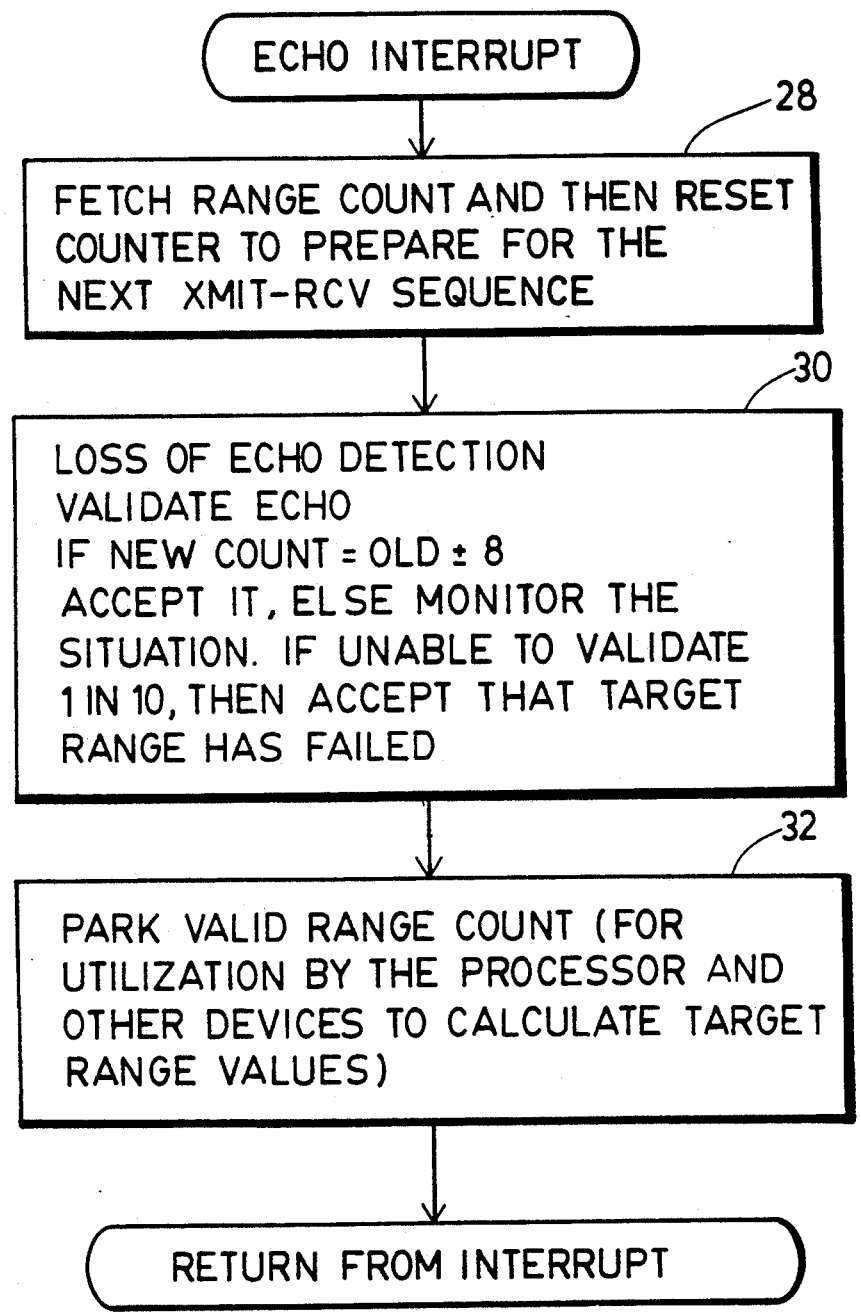
FIG. 2 is a flow diagram of certain aspects of the operation of the processor of the instrument.

After the blanking interval has elapsed, the receiver 24 becomes active and receives signals from the transducer. When a return echo, reflected from a surface being monitored, is received by the transducer and recognized by the receiver, the receiver sends a "stop counter" signal to the counter 16 and generates an output on an interrupt request line 26 to the processor, which executes a further interrupt service routine, schematised in FIG. 2. If no echo is detected, the counter overflows (in fact, the counter is considered to overflow as soon as its sixteenth or most significant bit goes high) and generates an interrupt on line 26. At step 28 in FIG. 2, the processor inputs the count from counter 16 through ports 18 and resets the counter through port 20. At step 30, the echo is validated. If no echo was detected, as indicated by the most significant bit of the count being high, a lost echo situation exists. If the count differs by more than a preset amount from a preceding count, it is not validated, unless repeated following similar counts are consistent with it, in which case it is accepted. A validated range count is stored, at step 32, for further processing by the processor 2, following which the processor returns from the service routine. The arrangements described above are in the main conventional, and provide a preferred but exemplary environment within which the present invention can be implemented, as exemplified by the transmitter and receiver arrangements of FIGS. 3 and 4.

Figure 3:
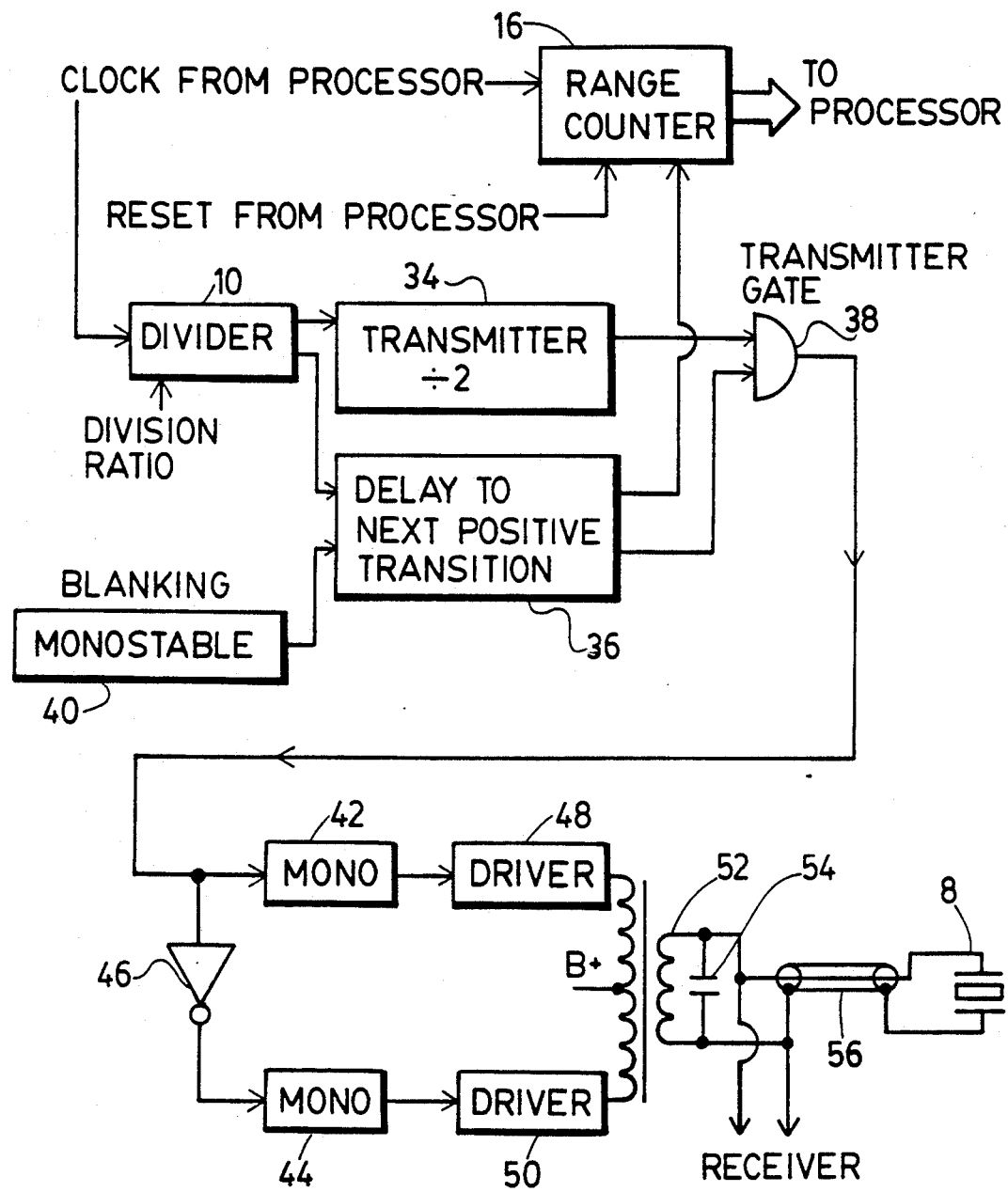
FIG. 3 is a simplified schematic diagram of the transmitter of the level measuring instrument.

The transmitter 22 is shown in more detail in FIG. 3. A clock signal from the processor 2 is applied to the range counter 16 as already described, and to the divider 10 to produce an output of twice the frequency at which the transducer 8 is to be energized. The output of this divider is applied to a divide-by-two counter 34 and as a clock signal to a D-type flip-flop 36 which receives a signal at its data input which is derived from the blanking signal by a monostable multivibrator 40 having a period equal to a multiple number of cycles of the transmitter signal. This period is selected so as to be just short of the period of energization required for the transducer 8 to reach its maximum sound output responsive to the level of energization applied to it, and will be dependent on the characteristics of the transducer and in particular its Q or quality factor, determined by both the transducer itself and its physical and electrical environment. In the present example, the period is three cycles, e.g. 60 ms at a transducer frequency of 50 khz. The flip-flop 36 provides outputs of the next positive transition of the signal from divider 10 following its receipt of the blanking signal, the outputs being used to start the range counter 16 and open a transmitter gate 38 to a timing synchronized to the beginning of a half cycle of the output of counter 16.

The output from the transmitter gate 38 is applied to two monostable multivibrators 42 and 44, to the latter via an inverter 46 so that it operates 180° out of phase with 42, which control driver circuits 48, 50 of the centre-fed primary of a transformer 52, the secondary of which is tuned by a capacitor 54 and connected by a cable 56 to the transducer 8. The monostable multivibrators 42 and 44 shorten the pulses applied to the drivers 48 and 50 in order to provide greater efficiency and an improved driving waveform.

Figure 4:
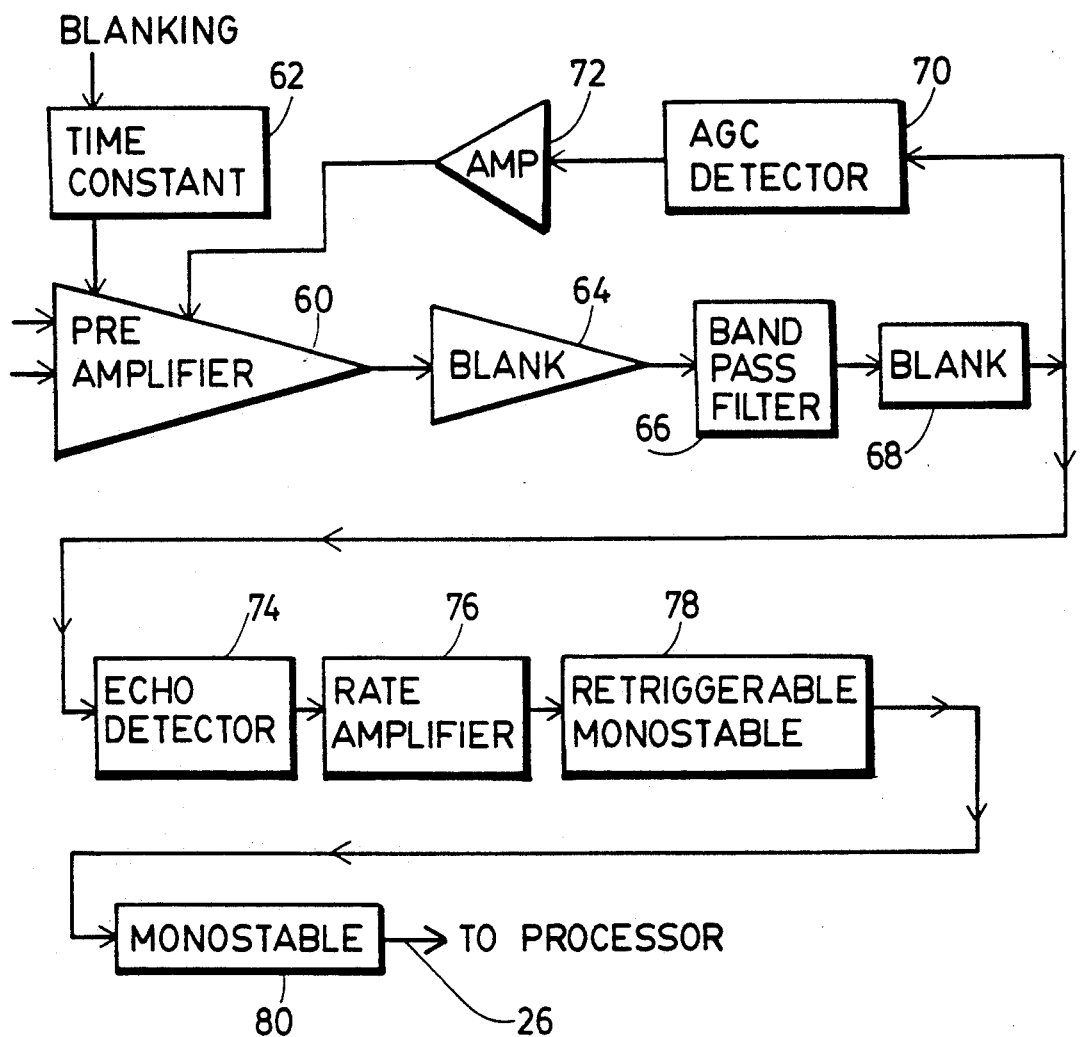
FIG. 4 is a simplified schematic diagram of the receiver of the instrument.

The receiver 24 is shown in more detail in FIG. 4. Signals from the transformer end of cable 56 are applied to a gain controlled preamplifier 60 which is also controlled by the blanking signal to be inactive during the blanking period, a time constant circuit 62 being included so that blanking is removed gradually to avoid any transients which produce spurious responses. After further amplification and blanking in stage 64, the received signal passes through a bandpass filter 66 and is again blanked at stage 68, before being applied on the one hand to an automatic gain control detector 70 and amplifier 72 which controls the preamplifier 60, and on the other hand to an echo detector 74, which is configured as a tracking peak detector. The output of detector 74 is applied to a differentiating circuit at the input of a rate amplifier 76 which generates a pulse for each step of the output of detector 74.

These pulse are applied to a trigger input of a retriggerable monostable multivibrator 78, the termination of whose output pulse triggers a further monostable multivibrator 80 which provides a pulse to line 26.

Figure 5:
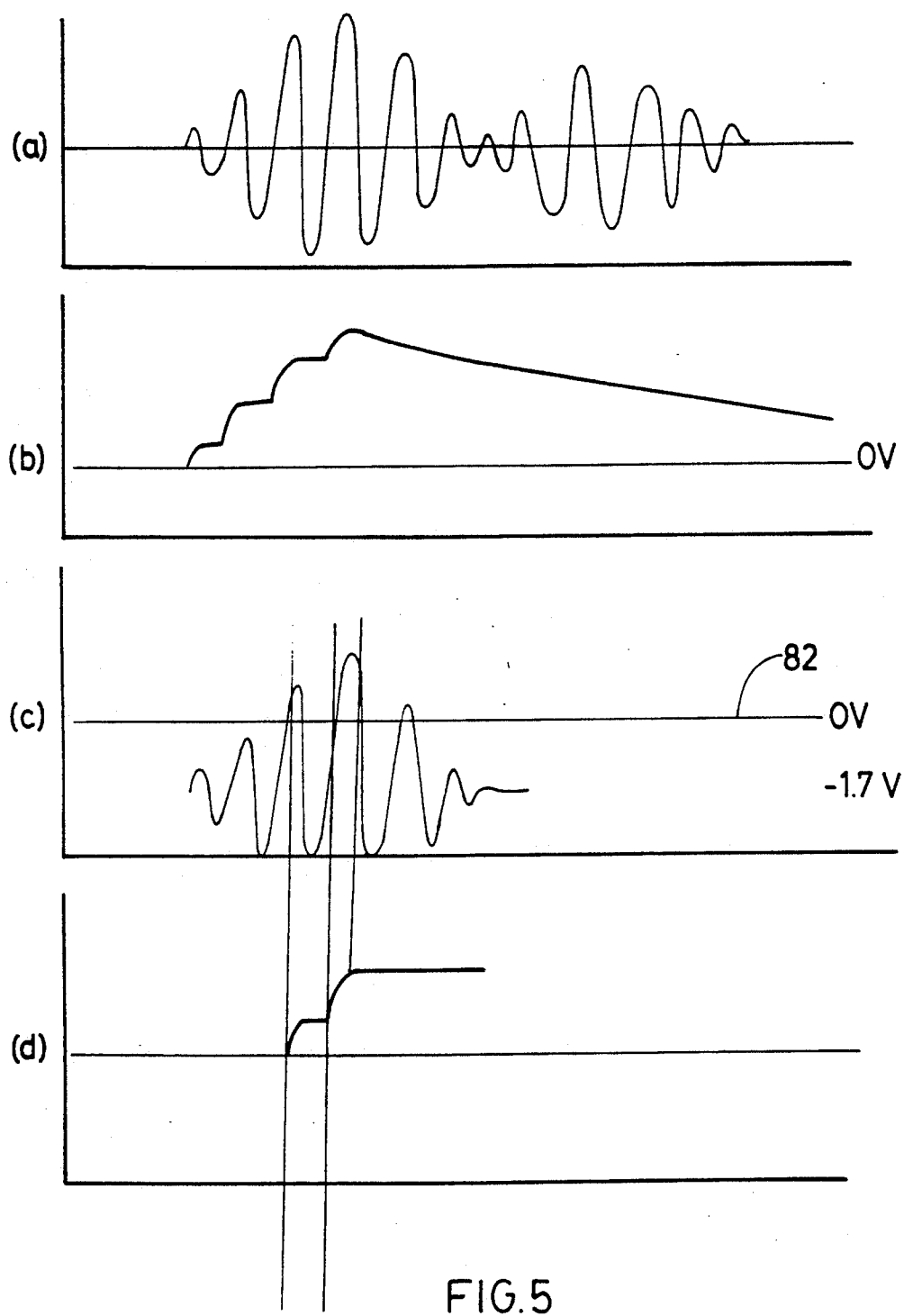
FIG. 5 shows typical waveforms appearing at the receiver.
Figure 6:
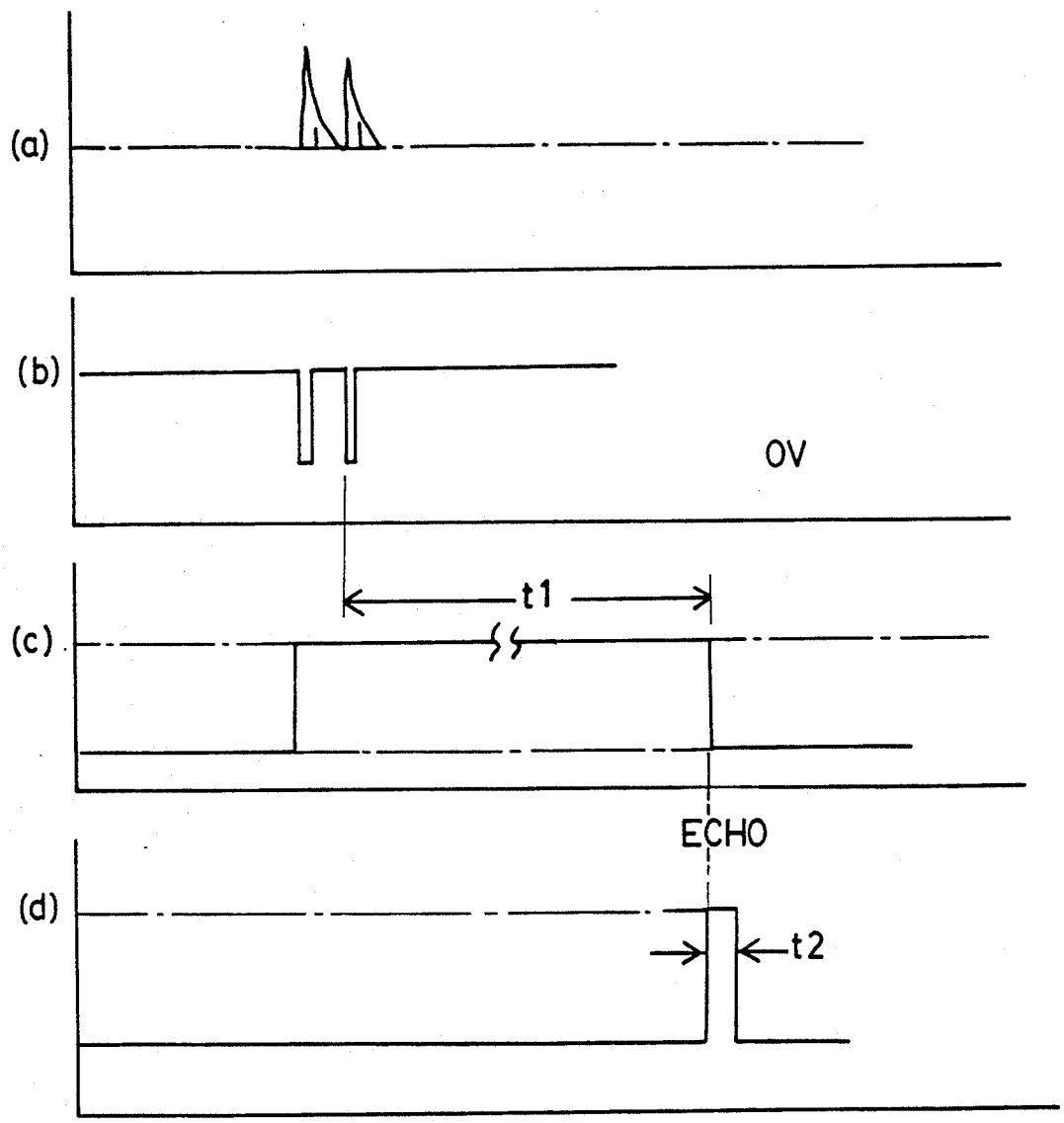
FIG. 6 shows additional waveforms appearing at the receiver.

The operation of the receiver may be better understood by reference to the waveforms shown in FIGS. 5 and 6. Waveform (a) in FIG. 5 shows a typical echo signal appearing at the output of the bandpass filter 66. It will be seen that the received signal has a well-defined maximum amplitude. Waveform (b) shows the output from the A.G.C. detector 70, which reflects the peak value of the signal and results in the A.G.C. amplifier 72 producing a signal such that the amplitude of the signal at the input of echo detector 74 is such that only the highest peaks of the signal exceed a detection threshold 82 (waveform (c)). Waveform (d) shows the output of the echo detector 74 as it responds to these peaks.

Referring now to FIG. 6, the differentiator at the input of the rate amplifier 76 results in the input to that amplifier being a series of pulses representing each increment in the output of the echo detector 74 (waveform (a)) which are squared and inverted to produce waveform (b)). Waveform (b) triggers a retriggerable monostable 78, whose period $t_1$ thus commences with the last pulse in the series produced by the rate amplifier, which indicates the largest amplitude cycle of the echo. The period of the monostable is greater than the period of the echo signal to ensure retriggering by each pulse from the rate amplifier, and it times out once the last pulse, representing the largest cycle, has been received. Timing out of the monostable 78 initiates generation by monostable 80 of the pulse that is applied to interrupt request line 26. The count stored by the counter 16, which is also stopped by the pulse from monostable 80, is transferred to the processor, which discounts it by the number of counts represented by the period $t_1$ and the time known to be taken by the transducer from the beginning of the transmit burst to reach its maximum amplitude under the conditions of operation. The remaining count which is saved by the processor represents the time from the beginning of the transmit burst to the leading edge of the echo, and is thus representative of the range being measured. This period should not be influenced by variations in the amplitude of the echo, provided that this amplitude is sufficient to exceed the detection threshold.

I claim:

1. In an acoustic pulse-echo ranging system comprising a transducer assembly, a transmitter supplying plural cycles of high frequency electrical energy to the transducer assembly to cause it to emit a shot of high frequency acoustic energy, a receiver receiving electrical signals generated by said transducer responsive to an echo formed by acoustic energy reflected back to said transducer by a target surface, and a counter counting an elapsed time between emission of said shot and receipt of said echo, the improvement wherein the transducer assembly has a sufficient quality factor that high frequency electrical energy must be applied to it for more than a plural first number of complete cycles before the amplitude of the emitted shot of acoustic energy has reached a maximum, the transmitter is configured supplying a plural number of complete cycles to the transducer assembly which is no greater than said first plural number, and the receiver is configured to detect that individual cycle of the received echo which has the maximum amplitude.

2. An acoustic pulse-echo ranging system according to claim 1, wherein the receiver includes a tracking peak detector.

3. An acoustic pulse-echo ranging system according to claim 2, wherein the receiver further includes a rate amplifier receiving the output of the tracking peak detector.

4. An acoustic pulse-echo ranging system according to claim 2, wherein the receiver includes an automatic gain controlled amplifier and a bandpass filter preceding the detector, and the detector is responsive only to signals exceeding a threshold amplitude.

5. A method of operating an acoustic pulse-echo ranging system comprising electrically energizing and electro-acoustic transducer with plural cycles of high-frequency electrical energy to cause it to transmit a multi-cycle shot of acoustic energy having an amplitude profile which is sufficiently sharply peaked that there is no ambiguity as to which cycle of the shot has a highest amplitude, and determining the temporal location of a peak amplitude of an echo of said shot received by said transducer in order to range a target producing said echo, wherein the duration of energization of the transducer producing the shot is timed to terminate energization before the amplitude of oscillation of the transducer has reached a maximum amplitude attainable response to a level of energization applied to the transducer.

* * * * *